No. 693,023. Patented Feb. 11, 1902.
J. D. IHLDER.
ELECTROMAGNETIC REGULATOR FOR ELECTRIC CURRENTS.
(Application filed June 7, 1901.)
(No Model.)
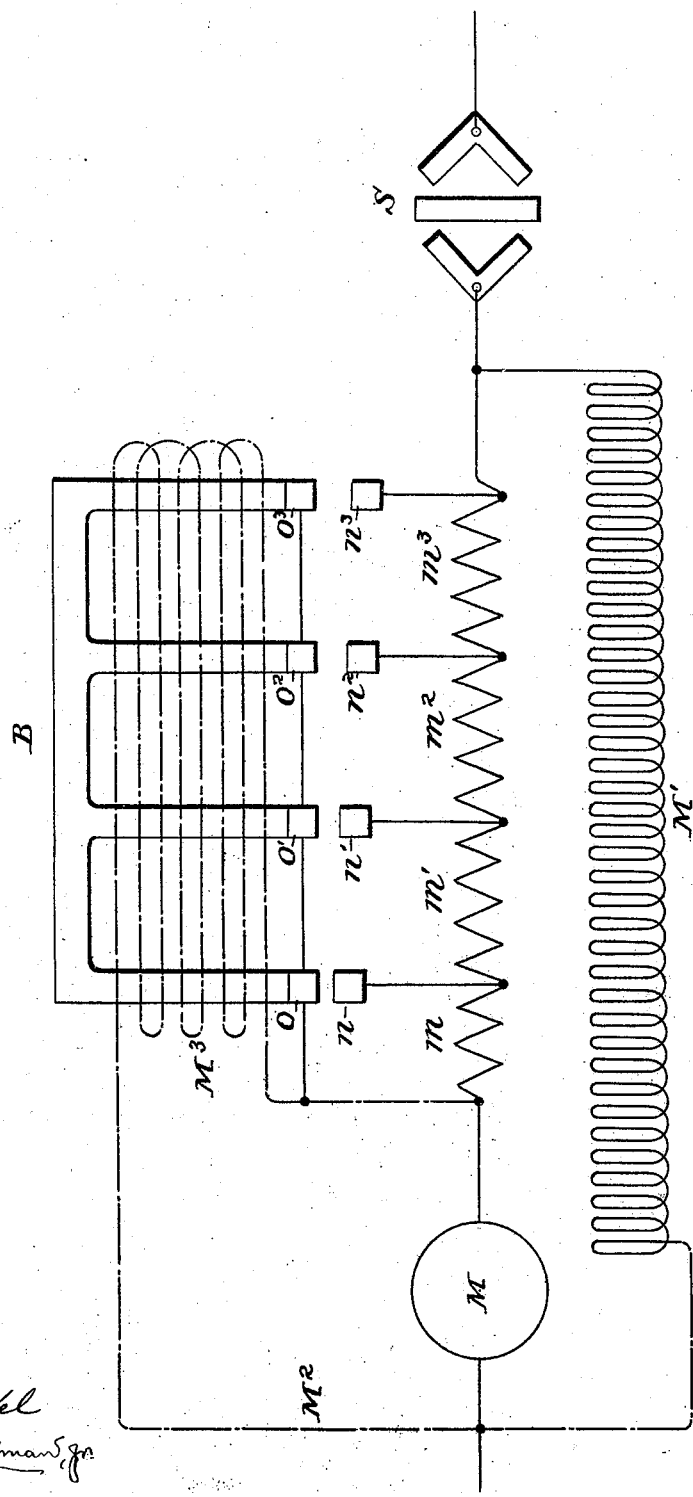

UNITED STATES PATENT OFFICE.

JOHN D. IHLDER, OF YONKERS, NEW YORK, ASSIGNOR TO OTIS ELEVATOR COMPANY, OF EAST ORANGE, NEW JERSEY, A CORPORATION OF NEW JERSEY.

ELECTROMAGNETIC REGULATOR FOR ELECTRIC CURRENTS.

SPECIFICATION forming part of Letters Patent No. 693,023, dated February 11, 1902.

Original application filed April 17, 1900, Serial No. 13,260. Divided and this application filed June 7, 1901. Serial No. 63,631.
(No model.)

*To all whom it may concern:*

Be it known that I, JOHN D. IHLDER, a citizen of the United States, residing at Yonkers, in the county of Westchester and State of New York, have invented certain new and useful Improvements in Electromagnetic Regulators for Electric Currents, of which the following is a specification.

My invention relates to electromagnetic regulators for electric currents, and has for its object to provide a delicate as well as a simple means for controlling electric circuits which shall operate by means of electromagnets in accordance with variations in the electric circuit embracing said magnets; and to these ends my invention consists in the features of construction and arrangement of parts, substantially as hereinafter more particularly set forth.

In my application, Serial No. 13,260, filed April 17, 1900, I have described and claimed, broadly, what I have defined as a "multiple" magnet having certain peculiarities of construction and have briefly stated therein some of the uses to which said magnet could be put, and this application is substantially a division of said prior application, made in accordance with the Office requirements.

In the accompanying drawing I have illustrated the construction of the magnet diagrammatically and shown one manner of using it in connection with a motor.

In this application it is deemed unnecessary to specifically describe all the details of construction of the so-called "multiple" magnet, which are fully set forth and claimed in the application above referred to, and it is sufficient herein to describe generally its construction and mode of operation and the manner in which it may be connected in an electric circuit to perform the functions intended.

Referring to the accompanying drawing, M represents the armature of a motor and M' the shunt field-magnet coils, and $m$ $m'$ $m^2$ $m^3$ indicate sections of a series resistance normally included in the armature-circuit. Connected to these resistance-sections are a series of armatures, represented in the present instance by the squares $n$ $n'$ $n^2$ $n^3$, and these are shown as arranged in proper relation to the magnet B, the pole-pieces of which are represented by the parts $o$ $o'$ $o^2$ $o^3$. It is to be understood that there may be any desired number of pole-pieces and of armatures arranged to coöperate with the pole-pieces.

The magnet B may be of any desired shape and construction, provided with a plurality of pole-pieces and wound with a coil, as $M^3$, which is adapted to be included in an electric circuit wherein there is a variable current, and in the present instance I have shown the circuit $M^2$ as being a shunt around the motor-armature and as including the coil $M^3$, surrounding the magnet.

The armatures $n$ $n'$ $n^2$ $n^3$ form or carry suitable contacts, and the pole-pieces of magnets also form or carry suitable contacts, represented at $o$ $o'$ $o^2$ $o^3$, and these contacts are connected together electrically and in such manner that when any one or more of the armatures is operated by the magnet to open or close the contacts controlled thereby more or less of the resistance will be included or excluded from the electric circuit, so as to vary the current flowing therein. Thus in the illustration shown when the armature $n$ is operated by the magnet to close contact between $n$ and $o$ a portion, as $m$, of the armature resistance is shunted, and, conversely, when the armature is opened or in the position shown the portion $m$ of the resistance is included in the circuit.

The armatures $n$ $n'$ $n^2$ $n^3$ are so constructed, arranged, or adjusted that they will be operated successively and progressively in accordance with variations in the magnetic effect of the current passing through the coils of the magnet, and while this may be accomplished in any of the ways set forth in my prior application or in any equivalent ways, in the present instance I have shown the armatures at varying distances from their respective pole-pieces, so that when the magnet B is energized one of the armatures will be attracted or released before the other armatures will be operated. In other words, the order and number of armatures that will be so attracted or released will depend upon variations in the magnetism of the magnet B, due to variations in the electric current flowing through the coil surrounding the magnet.

In the particular circuit illustrated in the drawing, assuming that the armatures are open and that the switch S is closed, the current passes through the resistance-sections $m$ $m'$ $m^2$ $m^3$ and the armature of the motor, and a certain amount of current will flow through the shunt-circuit M', and the circuit $M^2$ will also receive a certain proportion of current, which will energize the magnet B to a certain extent, and as soon as this is sufficient to attract the armature $n$, for instance, the sectional resistance $m$ is cut out or shunted, and more current flows to the armature, causing a variation in the current flowing through the circuit $M^2$, and if the magnet is further energized another armature, as $n'$, is closed, cutting out another section of resistance, and so on. If, on the other hand, the current flowing through the circuit $M^2$ varies or is reduced, one or more of the armatures will open, including in the motor-circuit the sectional resistance, and in this way more or less of the resistance will be included in the circuit, according to the variations in current flowing through the coil $M^3$, energizing magnet B. The result is that a very delicate as well as simple means of controlling resistance is provided which is entirely automatic and subject to various requirements and capable of being used in various relations in connection with electric circuits of motors or generators or other translating devices, as will be apparent to those skilled in the art.

Without limiting myself to the precise construction and arrangement shown, what I claim is—

1. The combination with a translating device and sectional resistance, of a magnet having a series of cores, a circuit including the magnet, and connections controlled by the armatures controlling the sectional resistance, substantially as described.

2. The combination with a translating device, and sectional resistance in circuit therewith, of a magnet having a series of cores, armatures connected with said sectional resistance, and a circuit connected with said translating device including the magnet, the armatures being arranged to be operated to control the sectional resistance according to variations of current in the magnet-coil, substantially as described.

3. The combination with the armature of a motor having a sectional armature-resistance, of a multiple magnet having a series of cores, a shunt-circuit around the armature embracing the cores, and a series of armatures connected to the sectional armature-resistance and arranged substantially as described so that the motor-armature resistance is cut in or out successively and progressively, substantially as described.

In testimony whereof I have signed my name to this specification in the presence of two subscribing witnesses.

JOHN D. IHLDER.

Witnesses:
  F. W. NEWELL,
  ROBERT WILSON.